United States Patent Office 3,565,836
Patented Feb. 23, 1971

3,565,836
DIFFUSER-CONTAINING SELF-ADHERING
PLASTISOL
Robert L. Fuller, New York, N.Y., assignor to Paisley
Products, Inc., Dover, Del., a corporation of Delaware
No Drawing. Filed Feb. 1, 1966, Ser. No. 523,850
Int. Cl. C08f 29/24
U.S. Cl. 260—17.5                 14 Claims

ABSTRACT OF THE DISCLOSURE

A coating composition capable of adhering strongly to smooth, hard substrates is provided by a dispersion of polyvinyl chloride-type resin (e.g., vinyl chloride homopolymers and copolymers) in a plasticizer for the resin. The dispersion contains a heat activated cross-linking admixture, in certain proportions, of an aldehyde-condensable compound (e.g., a phenolic resin), a methylene donor capable of providing methylene linkages for the aldehyde-condensable compound (e.g., hexamethylenetetramine) and a diffuser compound (e.g., lignocellulose) capable of dispersing volatile components generated by heating the composition to the fusion point of the polyvinyl chloride-type resin.

---

This invention relates to self-adhering, modified polyvinyl resin coating compositions. More particularly, this invention relates to plastisols and organosols of polyvinyl halide-type resins containing a heat activated, cross-linking system formed from an admixture of selected synthetic resins and/or precursors thereof, a methylene donor, and a diffuser compound which, upon the application of heat, rapidly cross-links to produce an impervious coating having strong adhesion for metal and other smooth; hard substances, to the resulting coated substrates, and to methods for preparing such plastisols and organosols; and coated substrates.

Heretofore, polyvinyl halide-type resin dispersions have been difficult to use as coatings for metals and similar smooth, hard substrates because of their poor adhesion for such materials. Usually, application of these dispersions as plastisols and organosols necessitates pretreatment of the surface of the metal or other substrate such as by physically altering the surface by roughing, etching, and the like, coating the surface with a primer coat or in some instances, applying a primer coat followed by the application of additional coating composition or combinations of these surface treatments.

In an effort to avoid the necessity of using a primer coat or pretreatment of the surface to be coated, it was proposed to incorporate additional thermosetting resinous materials or their precursors into the polyvinyl halide-type plastisols or organosols to effect cross-linking therein and thereby promote adherence to metal and similar surfaces. However, such practice often caused other difficulties. For example, volatile components produced during the cross-linking of the additional resins cause the vinyl resin to foam and become cellular. Consequently, the resulting coatings are unsuitable for many applications.

In order to overcome the disadvantages of the prior art, this invention contemplates self-adhering coating compositions capable of directly adhering to smooth surfaces of substrates such as steel, aluminum, glass, tin, wood, ceramic tile, and the like, without any adhesion-promoting pretreatment thereof, and which comprise plastisols and organosols of polyvinyl chloride-type resins containing a cross-linking admixture of aldehyde-condensable compounds, e.g., phenolic resin and/or precursors thereof, at least one methylene donor capable of allowing a low temperature cure during fusion of the polyvinyl chloride-type resin and at least one diffusor compound capable of diffusing volatile components produced during fusion and curing of said coating composition, whereby a smooth impervious coating is obtained. For example, the polyvinyl chloride-type resin plastisols and organosols of this invention contain, based on a total weight of the sol, a blend of from about 2 to about 20 percent by weight of phenolic resin and/or precursor thereof, from about 2 to about 10 percent by weight of at least one diffuser compound, and from about 1 to about 10 percent by weight of a methylene donor.

The term "polyvinyl chloride-type resin" as used throughout this application means vinyl chloride homopolymers and vinyl chloride copolymers wherein the vinyl chloride monomer is copolymerized with a minor proportion of at least one other copolymerizable ethylenically unsaturated compound. Representative of the ethylenically unsaturated compounds that may be copolymerized with vinyl chloride are vinyl esters such as vinyl acetate, vinyl propionate, vinyl butyrate; vinylidene halides such as vinylidene chloride and vinylidene bromide; acrylic and alpha-alkyl substituted acrylic acids, their esters, their amides and their nitriles such as acrylic acid, methylacrylate, acrylamide, methacrylamide, acrylonitrile and the like; the vinyl aromatic compounds such as styrene, and the like. In general the copolymers contain above 75 percent vinyl chloride, with the remainder of the polymer being the other ethylenically unsaturated compounds. It will be appreciated that because the protective coatings produced by the vinyl chloride copolymers are usually less passive than those produced by the vinyl chloride homopolymers, the latter are preferred for the purpose of this invention. Exemplary of the preferred commercially available polyvinyl chloride resins are those referred to by the trade designations Geon 121, 126, Exon 654, Vinylite VYNV, Vinylite QYNV, Marvinol VR–10, and the like.

The phenolic resins employed in this invention include heat fusible, phenolic novolak resins and the heat curable, one-step phenolic resins. The novolaks usually are prepared by using a molar ratio of formaldehyde to phenol of less than about 1 to 1 in the presence of a catalyst that is preferably acidic under appropriate reaction conditions. Novolaks are permanently fusible and soluble and do not themselves pass into a cross-linked state.

In order to make the novolak resin infusible and capable of being cured by heat, it must be further reacted with a methylene donor or a source of methylene bridges or linkages. Usually the methylene bridges are provided by compounds which generate formaldehyde which in turn subsequently provides additional methylene bridges between adjacent phenolic nuclei.

The one-step phenolic resins employed in the invention are prepared with a larger mole ratio of formaldehyde to phenol than is employed to prepare the novolaks. For example, under the influence of alkaline catalysts, phenol reacts with aqueous formaldehyde to attach hydroxmethyl (methylol) groups to form one to all three of the phenolic ortho and para positions with or without the establishment of methylene linkages between phenolic nuclei. Such resins may be cured to the thermoset (cross-linked) condition by the application of heat alone, but such cure does not proceed rapidly enough for the purposes of the invention; hence, the organic methylene donors are employed to accelerate the rate of cure.

The phenolic resin precursors that can be employed by the present invention include a variety of phenolic compounds, i.e., both mono- and poly-substituted hydroxy benzenes, and substituted derivatives thereof. Among the substituant groups there may be attached to the nucleus of the phenolic compound are alkyl, alkoxy, amino, halo, and the like. It will be appreciated that the aromatic nucleus may have one or more substituent groups, but at least one nuclear hydrogen atom should be present in an ortho or para position to be activating hydroxy group that is free of steric hindrances. In general these compounds contain from about 6 to about 15 carbon atoms and preferably contain from about 6 to about 10 carbon atoms. Representative of the specific phenolic compounds that may be employed in coating compositions are phenol, o-cresol, m-cresol, o-chlorophenol, m-bromophenol, 2,4-dimethyl phenol, 2 - ethyl phenol, mesitol, resorcinol, orcinol, and the like. In general, the polyhydric phenols such as resorcinol, are preferred because they exhibit greater activity and are less toxic than the monohydric phenols, such as phenol.

The organic compounds capable of being methylene donors contemplated by this invention include hexamethylenetetramine, paraformaldehyde, sym-trioxane, anhydroformaldehydeaniline, ethylene diamine formaldehyde, methylol derivatives of urea and melamine, and the like non-resinous compounds. Preferably the methylene donor is a nitrogen-containing compound such as hexamethylenetetramine which is a product of ammonia and formaldehyde. These organic compounds are considered methylene donors in that they effect rapid cross-linking of heat fusible novolak resins and the one-step phenolic resins or effect resinification of phenols with methylene or equivalent linkages by the application of heat.

The diffuser compounds suitable for preparing the coating composition of this invention are substantially inert, finely divided solids that will pass through a 200 mesh sieve and preferably through a 325 mesh sieve. Preferably each diffuser particle has a large surface area and a porous structure containing microscopic pores, cavities, or voids, that allow volatile components to expand into and be slowly diffused through the coating composition without formation of a cellular structure or surface imperfections.

Several organic and inorganic materials may be used as diffuser compounds. If organic, the diffuser compounds must be substantially insoluble in the plasticizers and other solvating materials in the coating composition. Swelling or other temporary effects which modify the size of the organic particles during curing of the coating composition do not negate their use as a diffuser compound.

If the diffuser particle is of inorganic material, it should be essentially water insoluble. Compounds which form hydrated crystalline or amorphous structures may be used.

Among the inorganic diffuser compounds that may be used are activated carbon, silica gel, activated alumina, fuller's earth, diatomaceous earth, microtraps, sodium silico aluminate, siliceous materials known as Mobilebeads, and naturally occuring and synthetic zeolites often designated as molecular sieves and the like. Representative synthetic zeolites are commercially designated as zeolite A, zeolite X, zeolite Y and the like.

The organic diffuser compounds include starch, a lignin acid derived from lignocellulose, cellulose and the like. Of the diffuser compounds enumerated above, sodium silico aluminate and a lignin acid derived from lignocellulose are particularly preferred because of their fibrous structure which forms a network of passages for dispersing volatile components.

One example of a lignin acid derived from lignocellulose suitable for use as a diffuser compound is "Tomlinite," a product of Dominion Tar, Ltd. Tomlinite is an amorphous brown powder which is isolated from hardwood kraft pulping liquors by precipitation with carbon dioxide. The resulting "lignin acid salt" in which strongly acidic groups are still present as the sodium salt is reprecipitated with sulfuric acid to free the resulting acid groupings and is then washed and flash dried to its final powder form.

It will be appreciated that at least one diffuser compound, at least one phenolic resin and/or precursor thereof, and at least one methylene donor, as well as mixtures of each, may be employed to prepare the plastisols and organosols of this invention.

As used herein, the expression "polyvinyl chloride-type resin plastisols" has reference to those liquid dispersions of finely divided resin particles in a plasticizer which may include small amounts of volatile non-aqueous diluents and/or dispersants and ingredients such as fillers, pigments, desiccants, and the like. When the voltatiles content of the dispersion exceeds about 3% of the total weight, it is referred to herein as an "organosol." The amount of volatiles may range from about 3% to about 60% of the weight of the organosol, but the relationship of the proportions between the resin and the plasticizer remains unchanged. Usually, the polyvinyl chloride-type resin constitutes from about 25% to about 80% of the total weight of the plastisol or organosol, with from 30% to 50% being the preferred range, and the amount of plasticizer may vary from about 10% to about 50%, and preferably from 20% to 40%, of the total weight of the plastisol or organosol.

The plastisols and organosols employed by the invention of this application may be prepared according to their end use requirements and as such require the incorporation of ingredients conventionally used to prepare such materials. Usually, the incorporation of the cross-linking admixture of the phenolic resin, the diffuser compound, and organic compound capable of being a methylene donor which causes the plastisol or organosol to bond to the substrate do not, for the most part, determine the choice of the vinyl chloride-type resin, plasticizers or other ingredients commonly employed therein.

The liquid plasticizers used to prepare the plastisols and organosols of this invention include any one, or a mixture of more than one, of the plasticizers that are used in the art for compounding plastisols and which are compatible with phenolic polymers employed herein. The liquid plasticizer solvates the polyvinyl halide at elevated temperatures; it is essentially nonvolatile and it remains solvated in the polymeric system upon cooling. When fluidity is to be promoted, plasticizers that are employed in the plastisols for use in the invention are liquid plasticizers that have higher boiling points.

By way of exemplification, suitable plasticizers for use in the plastisols and organosols include the liquid phthalates substituted with alkyl and/or alkoxyalkyl groups in which the alkyl groups contain a total of at least 8 carbon atoms, such as dibutyl phthalate, diamyl phthalate, dimethoxyethyl phthalate, dibutoxyethyl phthalate, dicyclohexyl; the dioctyl phthalates such as di-(n-octyl) phthalates, di-(2-ethyl-hexyl) phthalate, diisooctyl phthalates, didecyl phthalate, didodecyl phthalate, butylbenzyl phthalate, and mixtures of dialkyl phthalates which have an average of 8 carbon atoms in the alkyl group such as exist in mixtures of diheptyl phthalate, dioctyl phthalate and dinonylphthalate; also diphenyl phthalate, mixed ethoxyethyl phthalate, isooctyl isodecyl phthalate, and the like.

It will be appreciated that other plasticizers including the phosphonates and phosphates such as 2-ethylhexyl diphenyl phosphate, tricresyl phosphate, and the like, the polyalkalene glycol condensates, derived from the adipates, azelates and the like alkylene group donors and hydrocarbons and chlorinated hydrocarbons, such as aromatic petroleum oil and liquid chlorinated paraffin may be also employed.

In preparing the organosols that may be employed as the coating composition of this invention, a volatile organic liquid is required to achieve the desired fluidity of the composition. In general the liquid is essentially a nonsolvent for the polyvinyl halide resin whereas it may be a solvent for the epoxy and heat fusible phenolic novolak resins.

Typical organic volatile liquids include the volatile liquid aromatics such as benzene, toluene, xylene, ethyl benzene and isopropyl benzene, as well as the aliphatics such as methyl ethyl ketone, methyl isobutyl ketone, diacetone ketone, butyl carbitol, diethylene glycol monoethyl ether, cyclopentane, cyclohexane, and the like. The aromatic and/or aliphatic hydrocarbons may be used alone or in appropriate mixtures.

It will be appreciated that in preparing the coating compositions in this invention a wide variety of procedures and curing techniques may be employed. The amount of diffuser compound, phenolic resin and methylene donor employed as a cross-linking admixture to effect bonding of the polyvinyl chloride-type resin to the substrate may be varied depending upon the curing conditions employed.

In general, the fusion point of the polyvinyl chloride-type resin is of importance since cross-linking preferably occurs at or below this temperature. Thus, it has been found that heating the coating composition of this invention to temperatures of from about 275° F. to 400° F. for several minutes or until the volatile ingredients have evaporated and the resins are fused provides an adherent, noncellular protective coating for metals and the like. Higher temperatures may be employed, but usually they are not required to effect the curing necessary to provide self-adhesion for the coating compositions. In most cases, higher temperatures are avoided in order to prevent degradation of the polyvinyl chloride-type resins.

Advantageously, it has been found that after selection of the proper proportions of ingredients, no special mixing techniques are necessary for preparing the coating dispersions of this invention. Furthermore, no special application techniques need be employed for applying these materials to a substrate to be coated, and such conventional methods such as dipping, spraying, coating, knife coating or dispensing are completely satisfactory.

Although cross-linking of the phenolic resins with a methylene donor such as hexamethylenetetramine may take many routes, it is believed that heating hexamethylenetetramine causes it to break down to form formaldehyde and ammonia, and that these products in turn cause cross-linking of the phenolic resins. Apparently, the formaldehyde reacts with the phenolic novolak resin to form methylol groups on its phenolic nuclei. These methylol groups subsequently produce methylene bridges upon further heating of the plastisol and organosol compositions to the fusion state of the polyvinyl chloride-type resin. In this manner the novolak resin is converted from a fusible thermoplastic resin to a nonfusible thermosetting resin and the cure of the one-step phenolic resin is accelerated. In both cases the resulting products contain reactive polar hydroxyl groups that facilitate the bonding of the polyvinyl chloride-type resin dispersions to the metal or other hard, smooth substrates.

When, for example, a phenolic resin precursor, such as resorcinol, is used in place of or with the phenolic resin, the precursor rapidly condenses with the formaldehyde to form a phenolic resin in situ. This resinous product, in turn, cross-links with additional formaldehyde, via the above described reaction mechanism, to bond the polyvinyl chloride resin to the substrate.

The manner in which the diffuser compounds prevent foaming of the coating composition is not fully understood. However, it is believed that the diffuser particles act as adsorbent bodies which take up volatiles as they are formed and then slowly release and disperse at least a portion of the volatiles through the surface of the heated coating composition.

Furthermore since the ingredients involved, that is the methylene donor, the phenolic resin and/or precursors thereof, and diffuser compound are usually fine powders; their particles being dispersed throughout the composition, it is believed that the diffuser particles also aid in passage of the formaldehyde to the phenolic resin or precursor particles thereby resulting in more uniform resinification and cross-linking.

Advantageously, it has been found that use of a methylene donor and a lignin acid derived from lignocellulose, one of the preferred diffuser compounds in the coating composition provide an adhesive bond with metal surfaces with or without the addition of a phenolic resin or precursor thereof. Apparently the lignin acid derived from lignocellulose has a resinous component within its polymeric structure that condenses with formaldehyde in a manner similar to that of the phenolic compounds. For example, it has been found that an admixture of hexamethylenetetramine and a lignin acid derived from lignocellulose in a dispersion of polyvinyl chloride resin produces an impervious coating that strongly adheres to metal substrates without foaming. Although the exact nature of the reaction is not known, it is believed that there may be a complex resin residue in the lignocellulose derivative which cross-links with formaldehyde or that methoxy-substituted benzene nuclei in the lignin portion of the lignocellulose derivative resinifies with the formaldehyde.

It is also believed that the other organic compounds enumerated above as possible methylene donors also produce formaldehyde upon heating which in turn will react with the phenolics in the above-described manner.

Thus, it has been found that despite the formation of gases during the cross-linking reactions, the resultant coatings are nevertheless quite smooth and free of the fissures and pinholes which would be expected to arise from the presence of such gases within the cross-linking system.

The protective, self-adhering coating produced from plastisols or organosols by this invention comprise a fused resin strongly bonded to a substrate by the cross-linked system formed from the reaction of polyvinyl chloride type resin, phenolic type resin, and at least one organic compound capable of providing methylene linkages, i.e. (—$CH_2$—) at temperatures of from about 275° F. to 400° F.

This coating has been found to adhere directly to metal and other smooth, hard surfaces and to maintain its adhesion even when exposed to oils, gasoline, water, dry cleaning solvents, industrial solvents, and the like, as well as numerous other service conditions and environments.

Furthermore, in accordance with this invention, the polyvinyl chloride-type resin coating compositions provide a protective coating on the coated substrate which is not only smooth in appearance, but also which has increased abrasion resistance, increased strength at elevated temperatures and improved compression set. The expression "improved compression set" has reference to the ability of the coating to recover after it has been deformed under normal compression conditions.

Advantageously, the coating composition of this invention can be colored to simulate leather, wood, metal, and similar surfaces. Representative of the pigments, dyes, and the like that may be blended within the compositions are carbon black, titanium dioxide, chrome yellow, chrome green, molybdium orange, phthalocyanine blue, phthalocyanine green, and the like. Generally, the amounts of these materials may vary over a wide range and are determined primarily by the final hue or degree of opacity desired in the coating.

In addition, fillers, light and heat stabilizers, and the like compounding ingredients may also be added to the coating compositions. Among the light and heat stabilizers are the calcium, cadmium or lead soaps, oxides of barium or lead, lead silicate, hydrous tribasic lead sulfate, and the like; the fillers include calcium carbonate, calcium oxide, silica and the like materials. The presence of fillers is based primarily on the desired end use of the cured coating and they vary from about 0% to 25% by weight of the composition. The light and heat stabilizers, however, are usually necessary and will constitute from about 0.1% to 5% of the total composition.

It will be appreciated that certain ingredients such as calcium oxide may operate as catalysts to promote the cross-linking reactions that occur during the curing of the composition with the organic compounds capable of being methylene donors.

In order that the present invention may be better understood, the following examples are given as being illustrative, but not as being limitative thereof.

EXAMPLE I

A typical plastisol coating composition of this invention has the following recipe:

|  | Percent by weight |
|---|---|
| Polyvinyl chloride [1] | 30.00 |
| Di-decyl phthalate | 35.00 |
| Calcium carbonate | 13.00 |
| Calcium oxide | 2.00 |
| A lignin acid derived from lignocellulose [2] | 18.00 |
| Hexamethylenetetramine | 2.00 |
|  | 100.00 |

[1] PVC-71 made by Diamond Alkali Company.
[2] Tomlinite made by Dominion Tar, Limited.

The plastisol is prepared by blending the ingredients in a paddle mixer and then vacuum deairing, thus forming an intimately mixed uniform dispersion.

EXAMPLE II

Using the plastisol prepared in Example I, a coating is fused on a cold-rolled steel test panel at 350° F. for 20 minutes without foaming. After the coated panel is cooled, the coating is tested for adhesion and found to have an excellent bond with the metal. This test thus shows that lignocellulose functions both to prevent foaming and also to improve the adhesion of the polyvinyl chloride composition.

EXAMPLE III

Using the procedure set forth in Example II, a cold-rolled steel panel is coated with a plastisol having the following recipe:

|  | Percent by weight |
|---|---|
| Polyvinyl chloride [1] | 45.00 |
| Di-decyl phthalate | 35.00 |
| Calcium carbonate | 10.00 |
| Calcium oxide | 2.00 |
| A lignin acid derived from lignocellulose [2] | 6.00 |
| Hexamethylenetetramine | 1.00 |
| Resorcinol | 1.00 |
|  | 100.00 |

[1] PVC-71 made by Diamond Alkali Company.
[2] Tomlinite made by Dominion Tar, Limited.

This plastisol composition is fused on the panel at 350° F. for 6 minutes. Again the resulting film is totally free of any foam structure and when tested, shows excellent adhesion for the steel panel.

EXAMPLE IV

In this example a typical plastisol is prepared using a one-step phenolic resin and an inorganic diffuser compound from the following recipe:

|  | Percent by weight |
|---|---|
| Polyvinyl chloride [1] | 38.00 |
| Di-decyl phthalate | 40.00 |
| Calcium carbonate | 10.00 |
| Calcium oxide | 2.00 |
| Iron oxide pigment | 2.00 |
| Sodium silico aluminate [2] | 3.00 |
| Phenolic resin [3] | 3.00 |
| Hexamethylenetetramine | 1.00 |
| Resorcinol [4] | 1.00 |
|  | 100.00 |

[1] PVC-71 made by Diamond Alkali Company.
[2] Zeolex 80 made by J. M. Huber Corporation.
[3] BRP-4400 made by Union Carbide Plastics Corporation.
[4] Resorcinol, technical made by Heyden Newport Chemical Corporation.

A cold-rolled plate is then preheated and dipped into the plastisol to pick up a coating. The coated plate is then cured in an oven by heating in order to fuse the polyvinyl chloride resin and also to adhere the plastisol to the plate.

After being cooled to room temperature, the adhesion of the plastisol to the plate is evaluated and found to exhibit excellent bond.

EXAMPLE V

Using the plastisol composition described in Example IV, an organosol is prepared containing 90% by weight of the plastisol and 10% by weight of odorless kerosene. The organosol is applied to a fused thickness of 8 mils on a cold-rolled steel and evaluated in the manner described in Example IV.

What is claimed is:

1. A coating composition capable of adhering strongly to smooth, hard substrates which comprises a dispersion of polyvinyl chloride-type resin selected from the group consisting of vinyl chloride homopolymers and vinyl chloride copolymers wherein vinyl chloride is copolymerized with a minor proportion of at least one other copolymerizable ethylenically unsaturated compound, in a plasticizer for said resin, said dispersion containing from about 25% to about 80% by weight of said resin; from about 10% to about 50% by weight of said plasticizer; in a heat activatable cross-linking admixture comprising from about 2% to about 20% by weight of an aldehyde-condensable compound selected from the group consisting of a curable phenolic resin, phenolic resin precursor and mixtures thereof, from about 2% to about 10% by weight of at least one diffuser compound which is selected from the group consisting of a lignin acid derived from lignocellulose, sodium silico aluminate, and mixtures thereof, and which is in the form of micro porous particles that will pass through a 200-mesh sieve, and from 1% to about 10% by weight of at least one methylene donor compound, said percentages being based on the total weight of said composition; upon the application of heat, said methylene donor compound being capable of providing methylene linkages for said aldehyde-condensable compound and said diffuser compound being capable of dispersing volatile components generated by the application of heat whereby said composition provides a smooth, impervious coating upon being heated to the fusion point of the polyvinyl chloride-type resin.

2. A coated substrate having a protective coating fused directly thereon, said coating comprising a mass of fused polyvinyl chloride-type resin particles strongly bonded to the surface of said substrate by a heat-activated admixture containing about 25% to about 80% by weight of the polyvinyl chloride-type resin, said resin being selected from the group consisting of vinyl chloride homopolymers and vinyl chloride copolymers wherein vinyl chloride is copolymerized with a minor proportion of at least one other copolymerizable ethylenically unsaturated compound, from about 10% to about 50% by weight of a plasticizer for said resin; from about 2% to about 20% by weight of an aldehyde-condensable compound selected from the group consisting of curable phenolic resin, phenolic resin precursor and mixtures thereof; from about 2% to about 10% by weight of at least one diffuser compound selected from the group consisting of a lignin acid derived from lignocellulose, sodium silico aluminate, and mixtures thereof and which is in the form of microporous particles that will pass through a 200-mesh sieve and which is capable of dispersing volatile components generated by the application of heat to said admixture, and from about 1% to about 10% by weight of at least one methylene donor compound which, upon application of heat, is capable of providing methylene linkages for said aldehyde-condensable compound, said coating having been heated to the fusion point of the polyvinyl chloride-type resin.

3. A method of coating substrates with a polyvinyl chloride-type resin selected from the group consisting of vinyl chloride homopolymers, and vinyl chloride copolymer wherein vinyl chloride is copolymerized with a minor proportion of at least one other ethylenically unsaturated compound which comprises applying to said substrate a coating of a dispersion of particles of the polyvinyl chloride-type resin in a plasticizer for the resin; said dispersion containing from about 25% to about 80% by weight of the polyvinyl chloride-type resin, from about 10% to about 50% by weight of the plasticizer and a cross-linking admixture containing from about 2% to about 20% by weight of an aldehyde-condensable compound selected from the group consisting of curable phenolic resin, phenolic resin precursor and mixtures thereof, from about 2% to 10% by weight of at least one diffuser compound selected from the group consisting of a lignin acid derived from lignocellulose, sodium silico aluminate and mixtures thereof, and which is in the form of microporous particles that will pass through a 200-mesh sieve and which is capable of dispersing volatile components generated by the application of heat to said dispersion, and from about 1% to about 10% by weight of at least one methylene donor compound capable of providing methylene linkages for said aldehyde-condensable compound, said weight percentages being based on the total weight of the coating; and heating the applied coating to an elevated temperature of 275° to 400° F. until the polyvinyl chloride-type resin particles fuse into a mass that is strongly bonded to said substrate and an impervious coating is obtained.

4. The composition of claim 1 in which said plasticizer also contains a volatile diluent.

5. The composition of claim 1 in which the methylene donor is hexamethylenetetramine.

6. The composition of claim 1 in which said diffuser compound is a lignin acid derived from lignocellulose.

7. The composition of claim 1 in which said diffuser compound is sodium silico aluminate.

8. The coated substrate of claim 2 in which said plasticizer also contains a volatile diluent.

9. The coated substrate of claim 2 in which the methylene donor compound capable of forming methylene linkages is hexamethylenetetramine.

10. The coated substrate of claim 2 in which said diffuser compound is a lignin acid derived from lignocellulose.

11. The coated substrate of claim 2 in which said diffuser compound is sodium silico aluminate.

12. The coated substrate of claim 2 in which the coating is heated to a temperature of from about 275° F. to about 400° F.

13. The composition of claim 1 in which said dispersion also comprises from about 0.1 to 5% by weight of light and heat stabilizers and from 0 to 25% by weight of fillers.

14. The composition of claim 1 in which said methylene donor compound is selected from a group consisting of hexamethylenetetramine, paraformaldehyde, sym-trioxane, anhydroformaldehydeaniline, ethylene diamine formaldehyde, methylol derivatives of urea and melamine.

References Cited

UNITED STATES PATENTS

| | | | |
|---|---|---|---|
| 2,270,662 | 1/1942 | Raney | 91—70 |
| 2,519,442 | 8/1950 | Delorme et al. | 260—17.4 |
| 2,659,708 | 11/1953 | Berger et al. | 260—43 |
| 3,091,597 | 5/1963 | Henriques | 260—31.4 |
| 3,114,725 | 12/1963 | Kaufman | 260—32.8 |

FOREIGN PATENTS

| | | | |
|---|---|---|---|
| 514,037 | 10/1939 | Great Britain | 106—200 |
| 611,524 | 12/1960 | Canada | 106—288 |

OTHER REFERENCES

"Phenoplasts," Carswell, p. 35, vol. VII of "High Polymers," Interscience, 1947.

WILLIAM H. SHORT, Primary Examiner

E. A. NIELSEN, Assistant Examiner

U.S. Cl. X.R.

117—119.6, 123, 124, 132, 148, 161; 260—31.8, 38, 847